No. 718,795. PATENTED JAN. 20, 1903.
C. J. RICHARDSON.
CATTLE GUARD.
APPLICATION FILED AUG. 26, 1902.
NO MODEL. 2 SHEETS—SHEET 1.
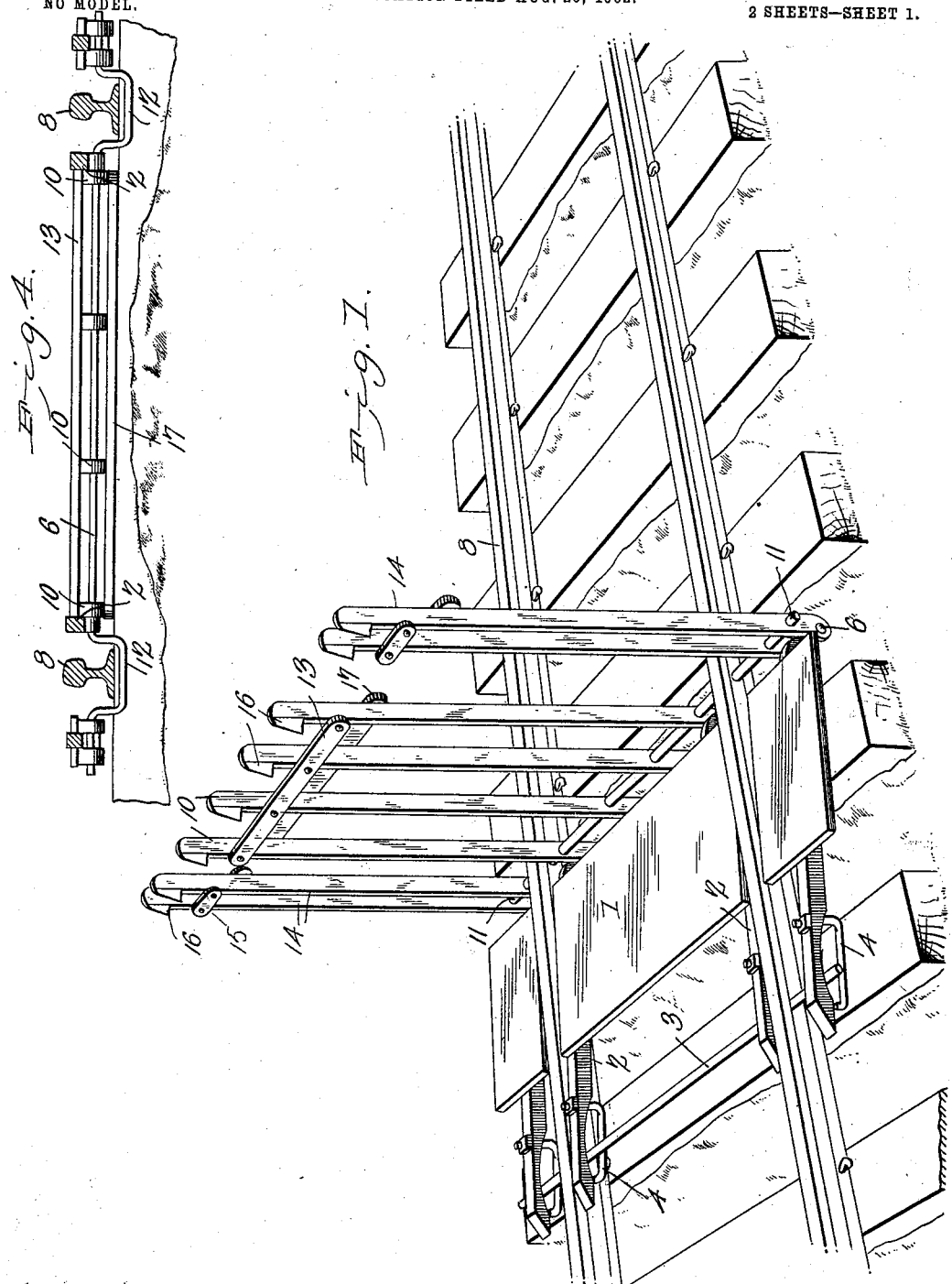
Witnesses
C. J. Richardson, Inventor
by C. A. Snow & Co.
Attorneys

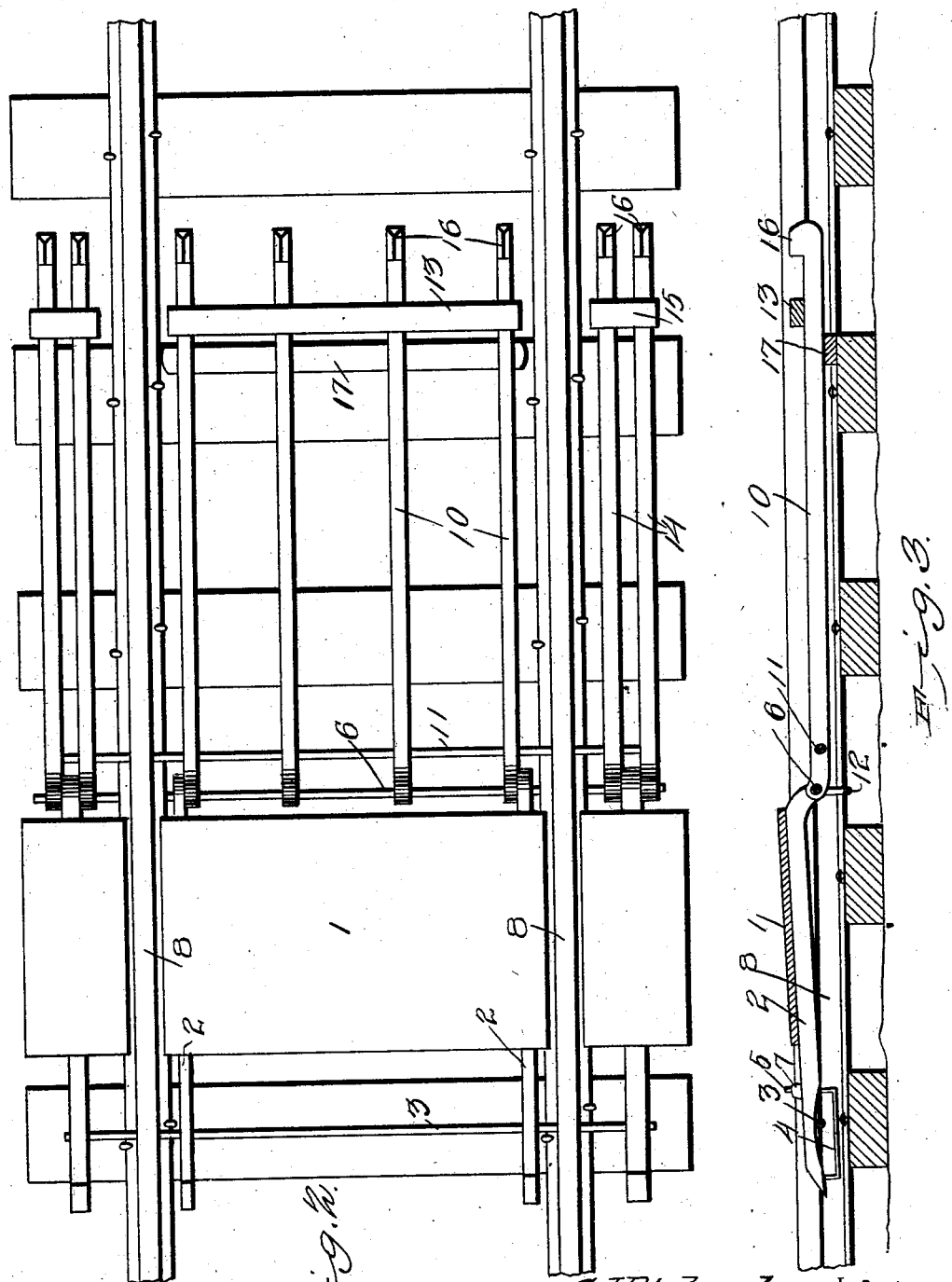

UNITED STATES PATENT OFFICE.

COLUMBUS JOHN RICHARDSON, OF CALDWELL, TEXAS.

CATTLE-GUARD.

SPECIFICATION forming part of Letters Patent No. 718,795, dated January 20, 1903.

Application filed August 26, 1902. Serial No. 121,128. (No model.)

*To all whom it may concern:*

Be it known that I, COLUMBUS JOHN RICHARDSON, a citizen of the United States, residing at Caldwell, in the county of Burleson and State of Texas, have invented a new and useful Cattle-Guard, of which the following is a specification.

The invention relates to improvements in cattle-guards.

The object of the present invention is to improve the construction of cattle-guards and to provide an exceedingly simple and inexpensive one of great strength and durability adapted to be readily applied to a railroad-track and capable of effectually preventing cattle from crossing from one field or inclosure into another at a point where the division-fence is intersected by a railroad-track.

The invention consists in the construction and novel combination and arrangement of parts hereinafter fully described, illustrated in the accompanying drawings, and pointed out in the claims hereto appended.

In the drawings, Figure 1 is a perspective view of a cattle-guard constructed in accordance with this invention, the gates being elevated. Fig. 2 is a plan view. Fig. 3 is a longitudinal sectional view. Fig. 4 is a transverse sectional view.

Like numerals of reference designate corresponding parts in all the figures of the drawings.

1 designates a platform of a central section of a cattle-guard, which is also provided with side sections constructed similar to the central section. The central section is located between the rails, as clearly shown in Figs. 1 and 2 of the drawings, and the platform, which is supported by longitudinal bars 2, is adapted to be depressed by the weight of an animal for elevating a gate to prevent the animal from crossing from one field or inclosure into another. The bars 2, which are slightly arched, as shown, are supported near their outer ends by a transverse rod 3 and retained thereon by pivoted loops or keepers 4, provided with pintle portions 5 at their inner ends and adapted to be turned horizontally beyond the rod 3 to release the platform for permitting the same to be swung upward on the rod 6 to expose the track to permit the same to be readily repaired. The pintle portion 5 of the keeper or loop 4 preferably extends through the bar 2 and is provided with a nut 7, as clearly shown in Fig. 3. The rod 3 extends through the rails 8 and supports the end sections of the cattle-guard.

The inner ends of the supporting-bars 2 are perforated to receive the rod 6, which also passes through perforations 9 of the adjacent ends of the bars 10 of the gate, which is fulcrumed on a pintle-rod 11, and the latter extends through the rails and forms pivots for the side sections of the cattle-guard. The rod 6, which supports the inner ends of the platforms, is provided with U-shaped bends 12, extending beneath the rails, as shown in Fig. 4. When the platform is depressed, the inner ends of the bars 10 are swung downward, and the gates of the sections are elevated to prevent the passage of an animal. The bars 10 of the central gate are connected by a transverse bar 13, and the bars 14 of the side gates are connected by cross-pieces 15, and each of the gate-bars is provided with a pointed spur or projection 16, arranged at the upper or outer end of the bar and adapted to prick an animal should the same come in contact with the gate. The central gate or gate-section is provided with a weight 17 for returning the cattle-guard to its initial position as soon as pressure is removed from the platform; but a spring or any other suitable means may be provided for this purpose, and any suitable means may be provided for limiting the upward movement of the gate.

It will be seen that the cattle-guard is exceedingly simple and inexpensive in construction, that it possesses great strength and durability, and that it is adapted to be readily applied to a railroad-track and is capable of effectually preventing animals from passing into a field or inclosure where the fence is intersected by a railroad-track. It will also be apparent that the platforms are adapted to be swung upward to expose the track when it is necessary to repair the same or the road-bed.

What I claim is—

1. In a cattle-guard the combination of a gate pivoted adjacent to one of its ends, a platform pivotally connected at one end with the adjacent end of the gate and adapted to be depressed to elevate the gate, a transverse rod supporting the outer end of the platform, and a pivoted keeper receiving the rod and adapted to be swung beyond the same to permit the platform to be raised for exposing the track, substantially as described.

2. In a cattle-guard, the combination of a gate pivoted between its ends, a platform provided with supporting-bars pivotally connected with one end of the gate, a rod supporting the bars at the outer end of the platform, and the approximately U-shaped loops or keepers depending from the outer portions of the bars and receiving the rod and provided with pivots and adapted to be swung beyond the rod to release the platform, substantially as described.

3. In a cattle-guard, the combination of central and side gate sections, a transverse rod extending through the rails and pivoting the gate-sections, a transverse connecting-rod passing through the gate-sections and provided with depending loops to extend beneath the rails, central and side platforms provided with supporting-bars pivoted at their inner ends to the connecting-rod, a transverse supporting-rod extending through and projecting beyond the rails and located near the outer ends of the supporting-bars, and depending loops or keepers carried by the supporting-bars and detachably receiving the adjacent rod, substantially as described.

In testimony that I claim the foregoing as my own I have hereto affixed my signature in the presence of two witnesses.

COLUMBUS JOHN RICHARDSON.

Witnesses:
T. L. DEARMAN,
H. JONES.